(12) United States Patent
Guo

(10) Patent No.: US 6,843,499 B2
(45) Date of Patent: Jan. 18, 2005

(54) FOLDABLE BABY STROLLER

(76) Inventor: Jyan-Tsai Guo, No. 341, An Shi Rd., Jia Li Jen, Tainan Hsien (TW)

(*) Notice: Subject to any disclaimer, the term of this patent is extended or adjusted under 35 U.S.C. 154(b) by 164 days.

(21) Appl. No.: 10/354,815

(22) Filed: Jan. 29, 2003

(65) Prior Publication Data
US 2004/0145157 A1 Jul. 29, 2004

(51) Int. Cl.[7] ................................................. B62B 9/12
(52) U.S. Cl. ......................... 280/642; 280/650; 297/42; 403/85; 403/93
(58) Field of Search ................................ 280/638, 639, 280/641–644, 647, 649, 650, 658, 47.4, 42, 47.38, 47.41; 297/354.12, 42, 45, 234, 243, DIG. 4, 366–369; 403/83–85, 91–93, 96, 101, 102

(56) References Cited

U.S. PATENT DOCUMENTS

| | | | | |
|---|---|---|---|---|
| 4,007,947 A | * | 2/1977 | Perego | 280/642 |
| 4,062,555 A | * | 12/1977 | Peng et al. | 280/42 |
| 4,077,641 A | * | 3/1978 | Perego | 280/42 |
| 4,118,052 A | * | 10/1978 | Cabagnero | 280/642 |
| 4,181,317 A | * | 1/1980 | Toda | 280/42 |
| 4,353,577 A | * | 10/1982 | Giordani | 280/642 |
| 4,542,916 A | * | 9/1985 | Kassai | 280/642 |
| 4,828,278 A | * | 5/1989 | Shinroku et al. | 280/644 |
| 4,986,564 A | * | 1/1991 | Liu | 280/642 |
| 5,221,106 A | * | 6/1993 | Shamie | 280/644 |
| 5,288,098 A | * | 2/1994 | Shamie | 280/642 |
| 5,388,852 A | * | 2/1995 | Bigo et al. | 280/642 |
| 5,669,625 A | * | 9/1997 | Jane Cabagnero | 280/647 |
| 5,755,455 A | * | 5/1998 | Chen et al. | 280/642 |
| 5,806,877 A | * | 9/1998 | Huang | 280/642 |
| 5,871,227 A | * | 2/1999 | Huang | 280/642 |
| 6,386,575 B1 | * | 5/2002 | Turner | 380/647 |
| 6,428,034 B1 | * | 8/2002 | Bost | 280/650 |

* cited by examiner

Primary Examiner—Christopher P. Ellis
Assistant Examiner—Bridget Avery
(74) Attorney, Agent, or Firm—Charles E. Baxley

(57) ABSTRACT

A stroller includes two rear upright tubes and two assist tubes which are respectively connected to the rear upright tubes in parallel by two joint members. At least one folding assembly is connected between the two upright tubes. The rear upright tubes and the two assist tubes reinforce the structure of the stroller. Two adjusting members are mounted to the rear leg tubes and a handle is biased by torsion springs and a pin connected to the handle extends through the adjusting member so as to engage a notch defined in the rear leg tube. A backrest is pivotably connected to the adjusting members which is positioned by engaging the pin with the notch in the rear leg tubes so that the backrest can be leaned in a stable status.

1 Claim, 11 Drawing Sheets

FOLDABLE BABY STROLLER

FIELD OF THE INVENTION

The present invention relates to a stroller and more particularly, to a frame structure for a baby stroller and the frame has better strength structure and the backrest is reliably pivotably connected on the rear leg tubes.

BACKGROUND OF THE INVENTION

A first conventional stroller is shown in FIG. 1 generally includes two front leg tubes 100 and two handles 120 connected to the front leg tubes 100 at two respective joint members 110. Each handle 120 has another joint member 111 so as to be pivotably connected to a rear leg tube 130 which is connected to one of two ends of a lower folding link 150, one of two support links 160, and one of two seat tubes 170 by two L-shaped plates 140. Two crossly connected links 180 are connected between the handle 120 and the rear leg tube 130. A folding link 190 is connected between the two links 180. By this arrangement, the stroller can be easily folded by pulling upward. This type of stroller tends to fall and is not satisfied by the customers.

FIG. 2 shows a second stroller wherein the links 181 are U-shaped and pivotably connected in a cruciform style, and a folding link 182 is connected between the two links 181. This U-shaped links 181 occupy too much space which is inconvenient for being stored or even packed.

FIGS. 3 and 4 show a third stroller which includes front leg tubes "A", two rear leg tubes "B", two handles "C", a seat frame "D", chases links "E" and a backrest frame "F". A folding link "G" is connected between the tubes of the backrest frame "F". Two support tubes "H" are connected between the two rear leg tubes "B" and a folding link "I" is connected between the two support tubes "H". A collapsible tube "J" controls the folding action of the stroller. In order to allow the backrest frame "F" to be pivoted backward, the parallel support tubes "H" are existed. The angle between the rear leg tubes "B: and the handles "C" is sacrificed for allowing the stroller to be folded. In other words, the rear leg tubes "B" have to be two straight tubes and this makes the stroller to be unstable.

The present invention intends to provide a stroller which has stable operation condition and the backrest can be pivoted backward without requiring sacrifice of the structure.

SUMMARY OF THE INVENTION

In accordance with one aspect of the present invention, there is provided a stroller that includes two front leg tubes each having a front wheel and two handles are respectively connected to the two first joint members. Two rear leg tubes are respectively connected to two handles and each rear leg tube has a rear wheel.

Two rear upright tubes each having a top end connected to the handle corresponding thereto and two joint members are respectively mounted to each rear upright tube. A lower end of each rear upright tube is fixedly connected to the lower joint tube and the upper joint member is movably mounted to the rear upright tube. Two assist tubes are located beside the rear upright tubes and a top end of each assist tube is fixedly connected to the upper joint member and a lower end of each assist tube movably extends through the lower joint member.

Two seat tubes are respectively connected to the front leg tube and the lower end of the assist tube on the same side as the seat tubes. Two backrest tubes are pivotably connected to the seat tubes and a support plate is connected between the backrest tube and the rear leg tube on the same side of the backrest tubes. At least one folding assembly is pivotably connected between the two lower ends of the assist tube and between the two handles.

Two adjusting members are respectively mounted to the rear leg tubes and each adjusting member has two inclined slots defined through a wall thereof. A protrusion extends from an outside of each adjusting member and two tubes extend on two ends of the protrusion. A torsion spring member has two torsion spring parts which are connected by a connection portion. The two torsion spring parts are respectively mounted to the two tubes and the connection portion contacts against the protrusion. Each torsion spring part has a hook portion.

A U-shaped handle has two side plates between which the adjusting member is located and each side plate has an elongate hole. A pin extends through the two elongate holes and the inclined slots of the adjusting member. A distal end of each of the side plates is pivotably connected to the two tubes and the two hook portions are respectively hooked on the two side plates. The pin is disengageably engaged with a notch defined in each of the two rear leg tubes by force from the two torsion spring parts.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
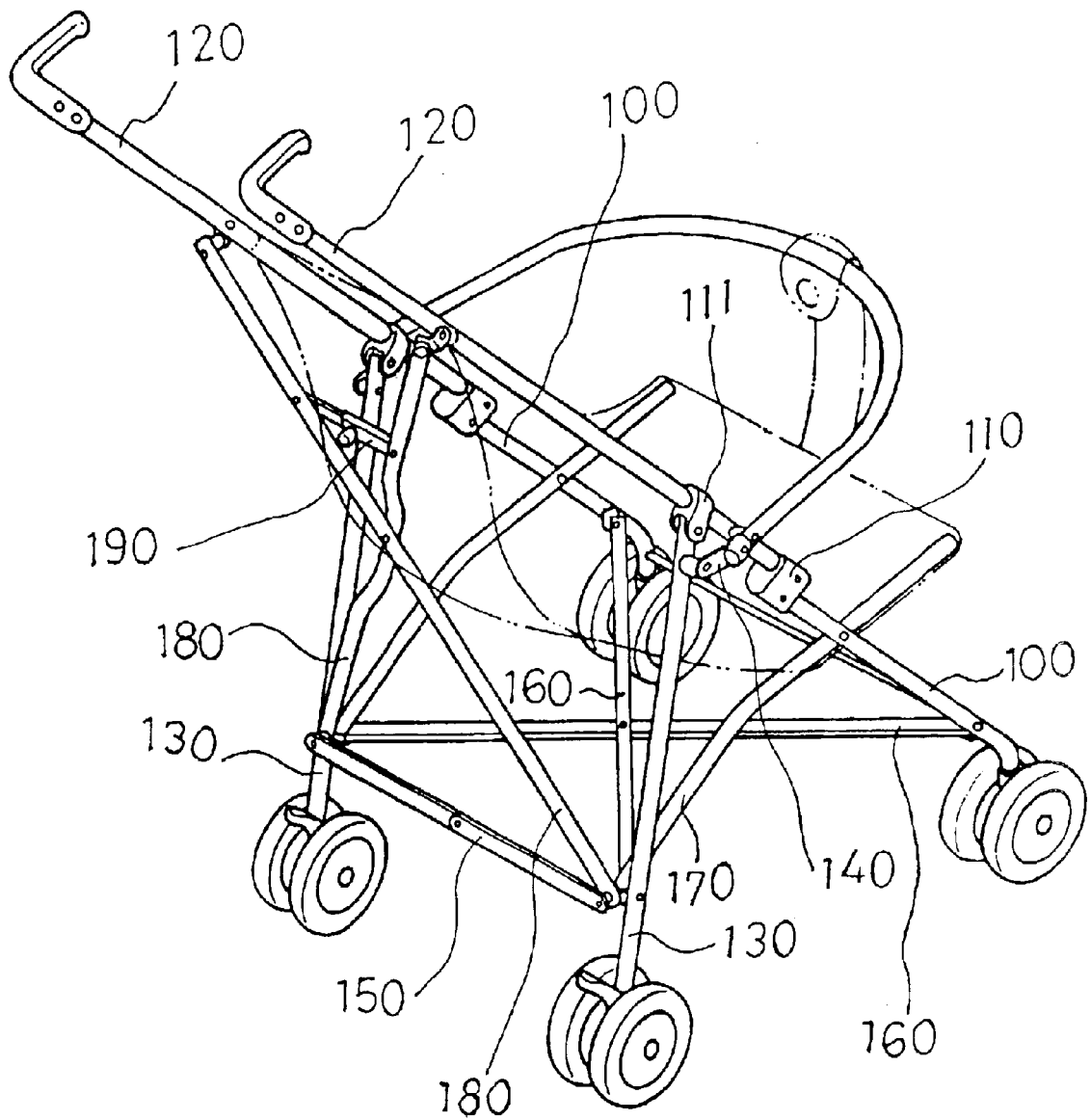
FIG. 1 shows a first conventional stroller.
Figure 2:
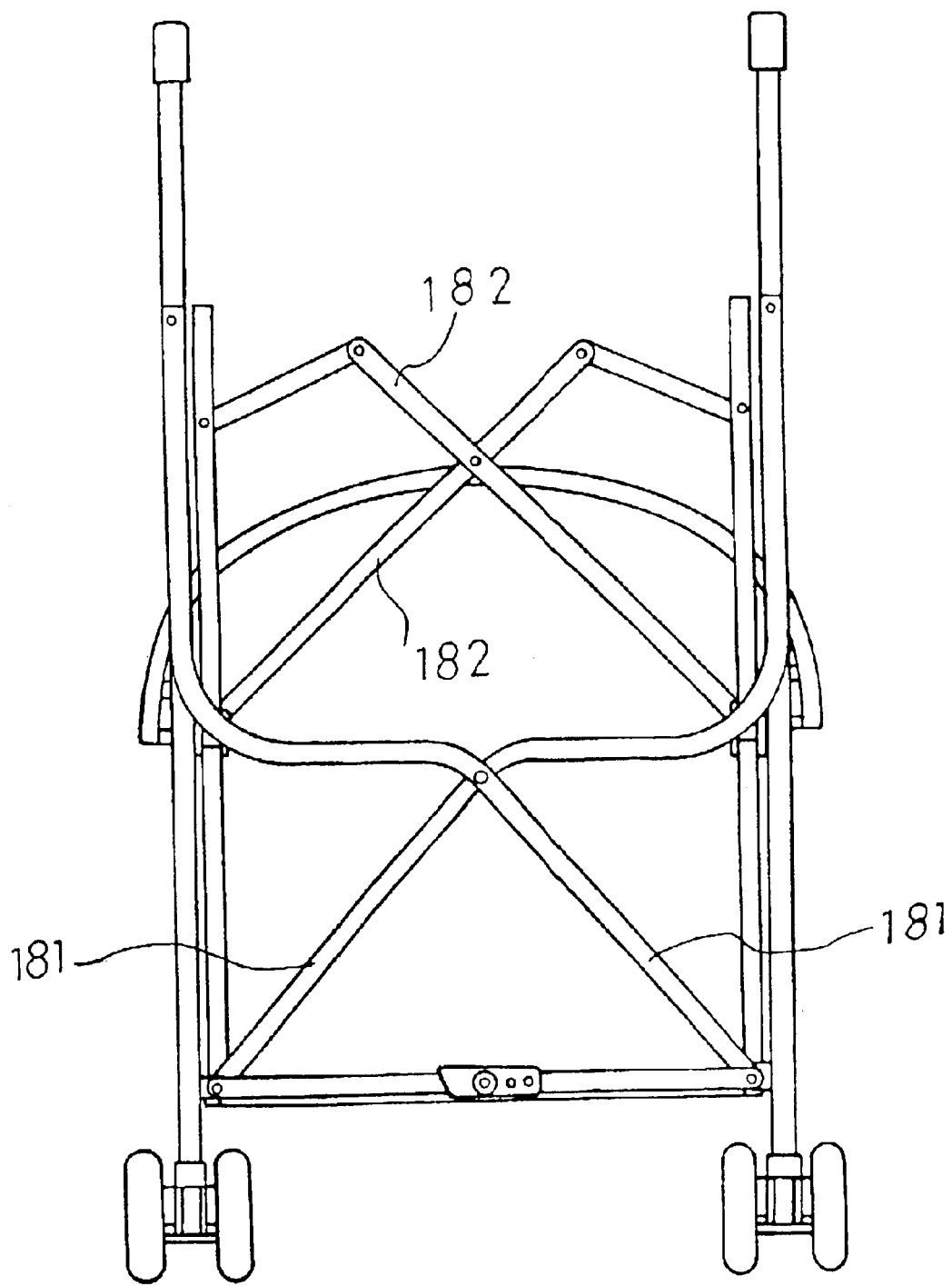
FIG. 2 is a rear end view to show a second conventional stroller.
Figure 3:
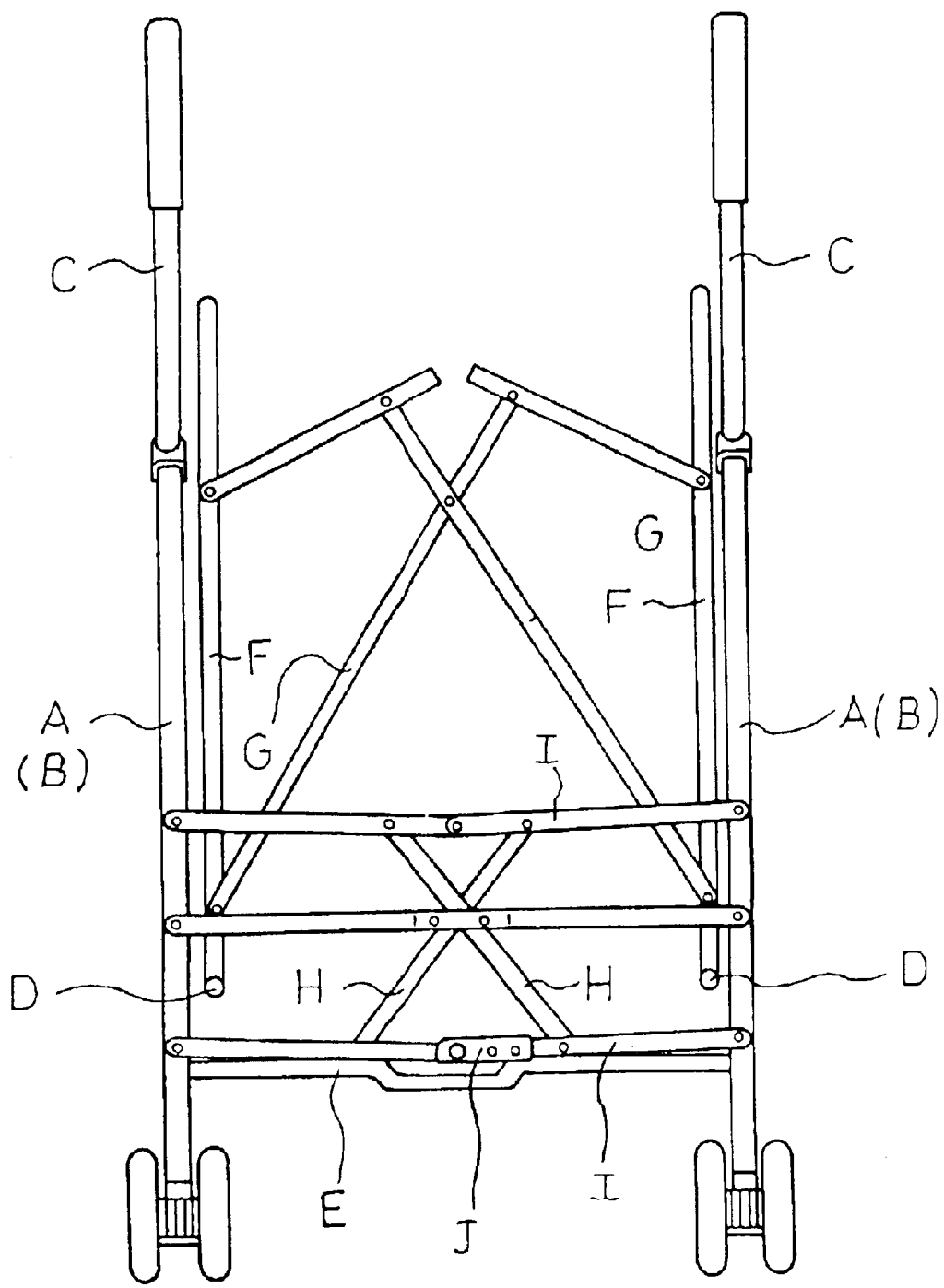
FIG. 3 is a rear end view to show a third conventional stroller.
Figure 4:
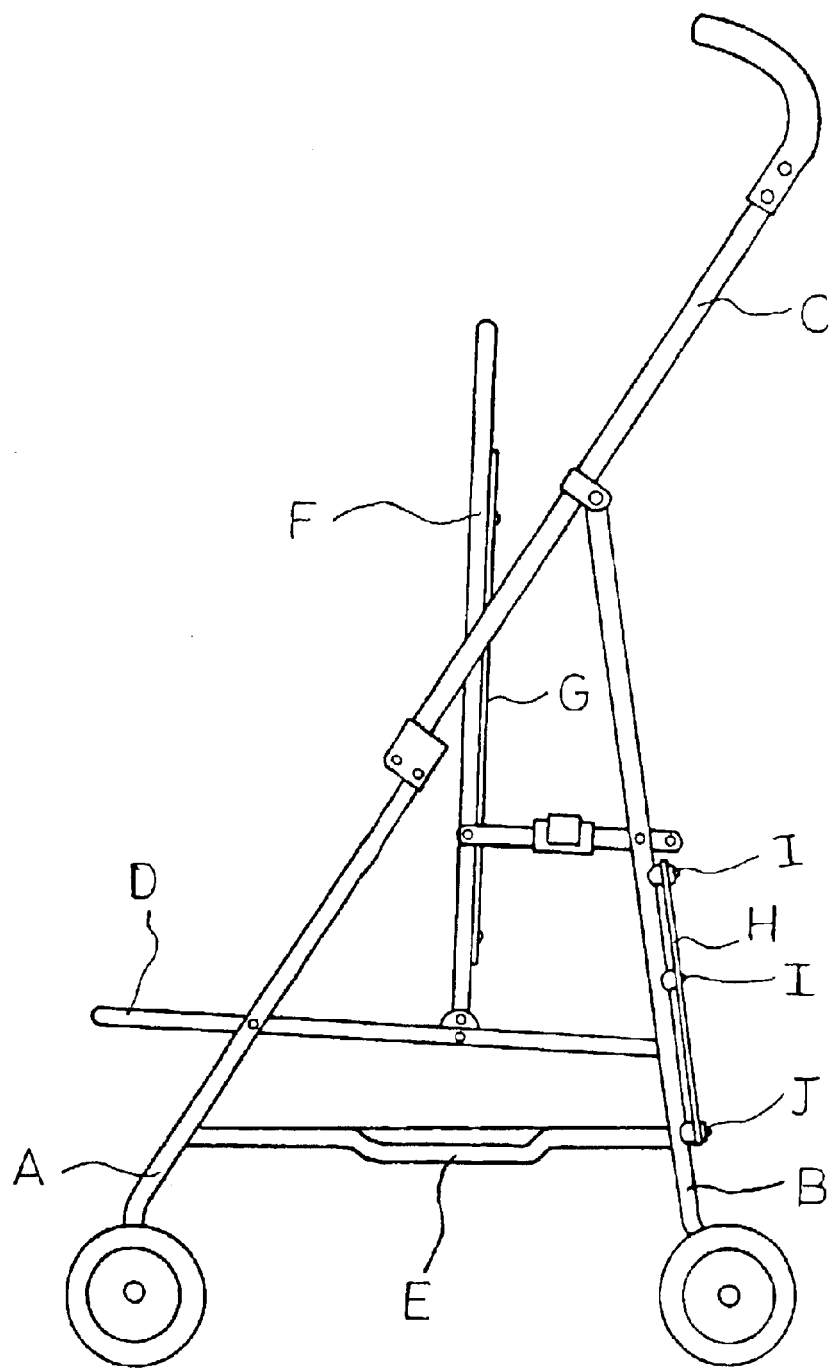
FIG. 4 is a side view to show the conventional stroller as shown in FIG. 3.
Figure 5:
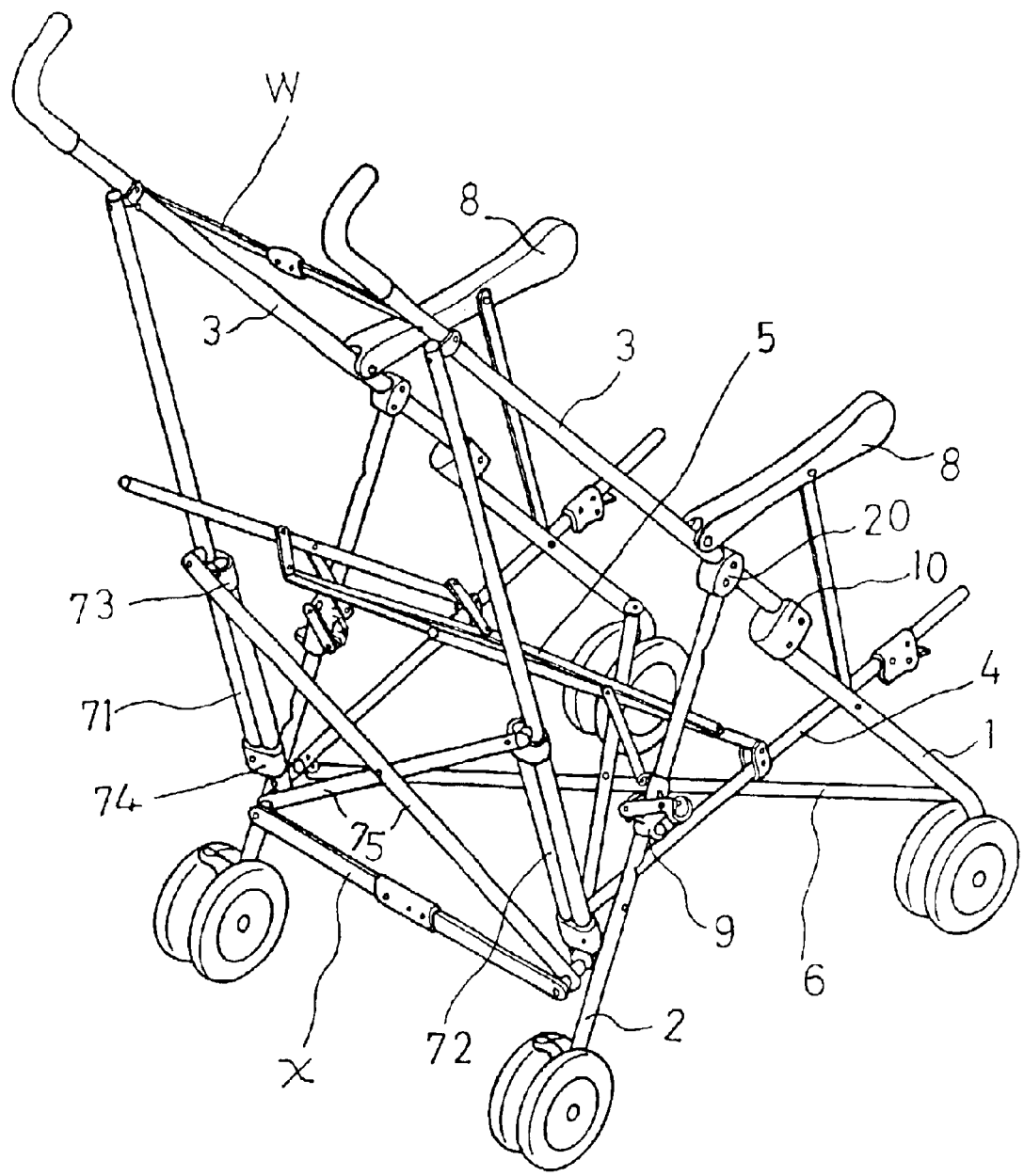
FIG. 5 is a perspective view to show the stroller of the present invention.
Figure 6:
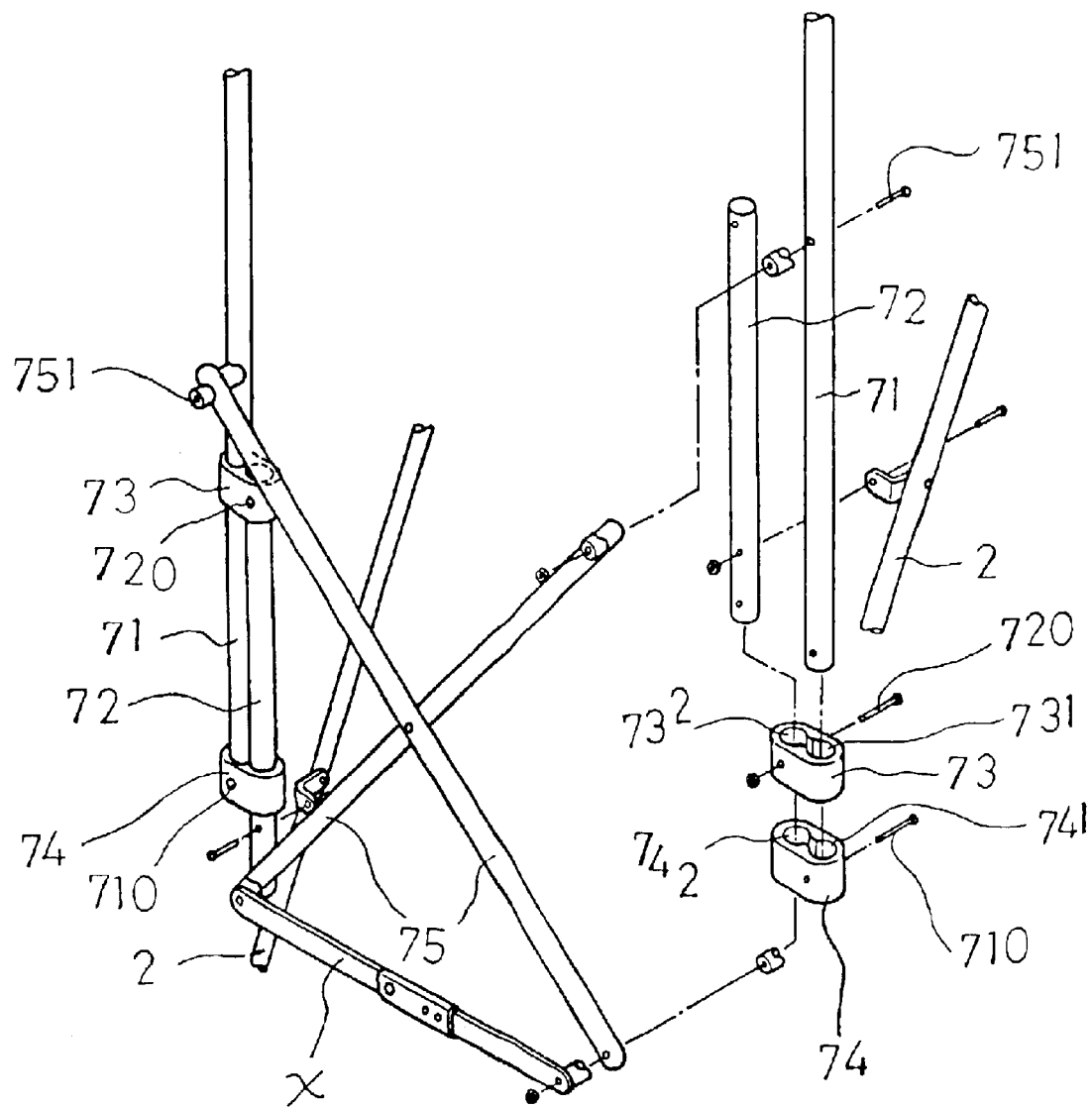
FIG. 6 is an exploded view to show the rear upright tubes and the assist tubes of the stroller of the present invention.
Figure 7:
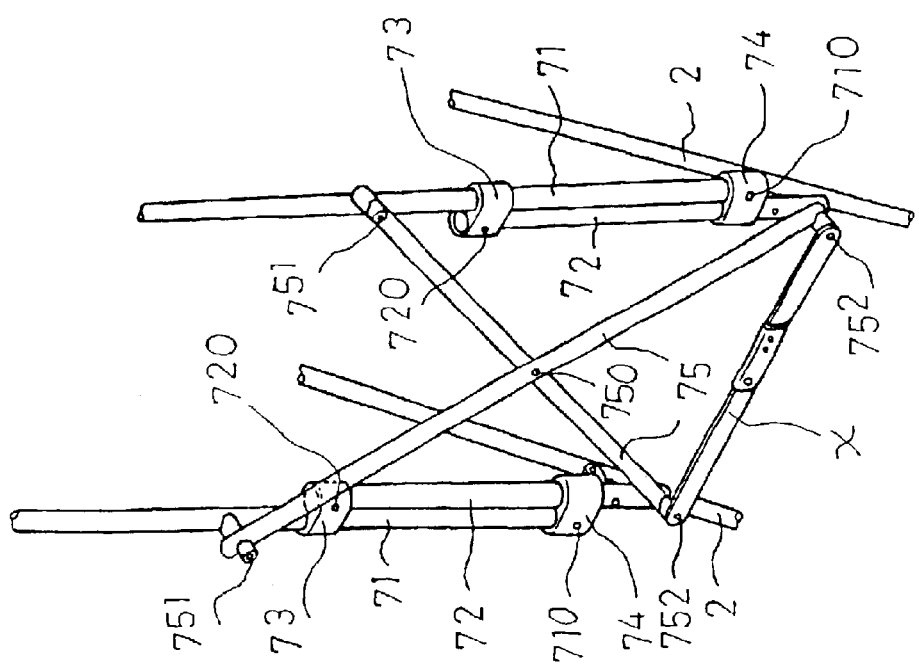
FIG. 7 shows the assembled the rear upright tubes and the assist tubes of the stroller of the present invention.
Figure 9:
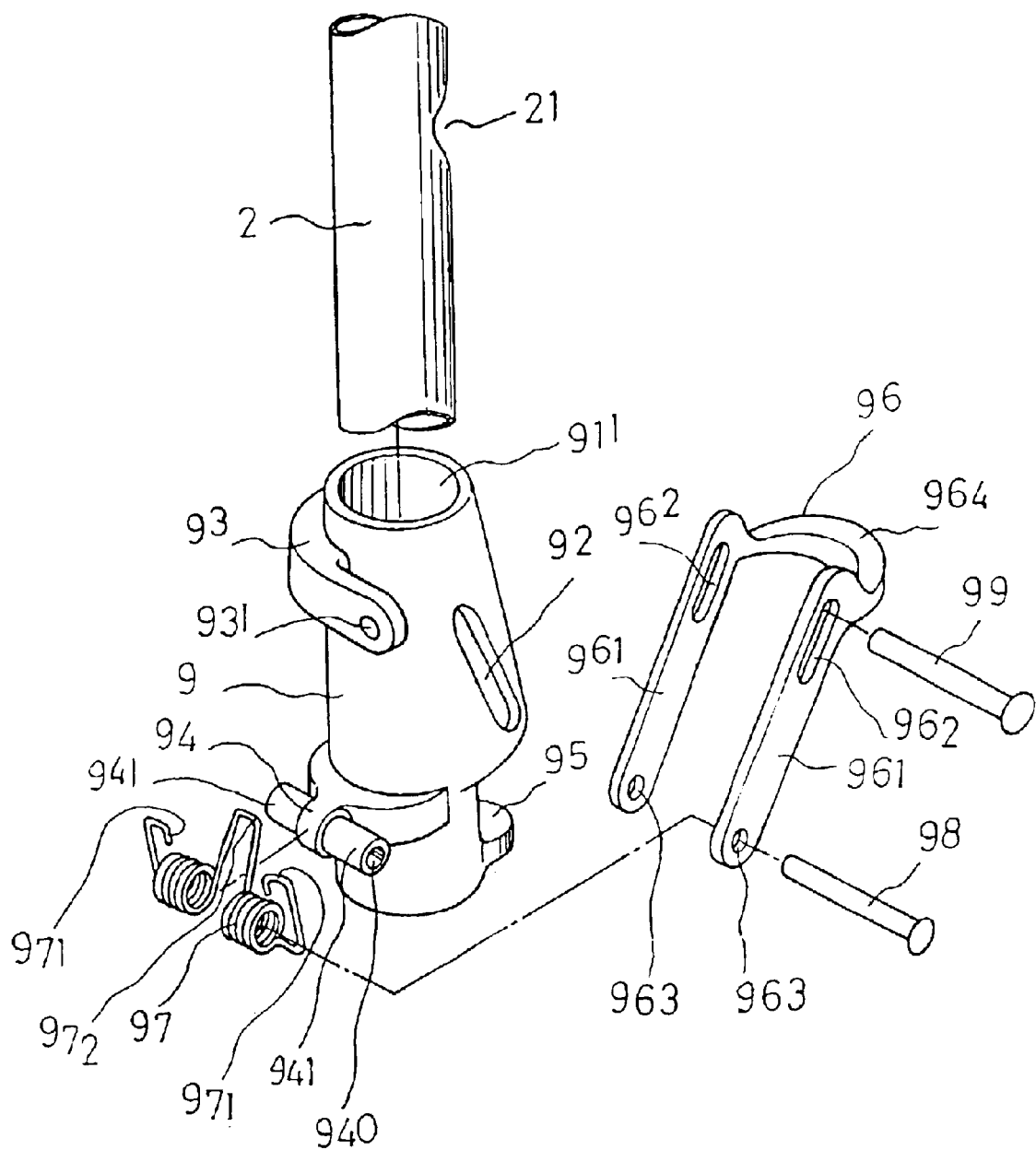
FIG. 9 is an exploded view to show the adjusting member, the handle and the spring member of the stroller of the present invention.
Figure 10:
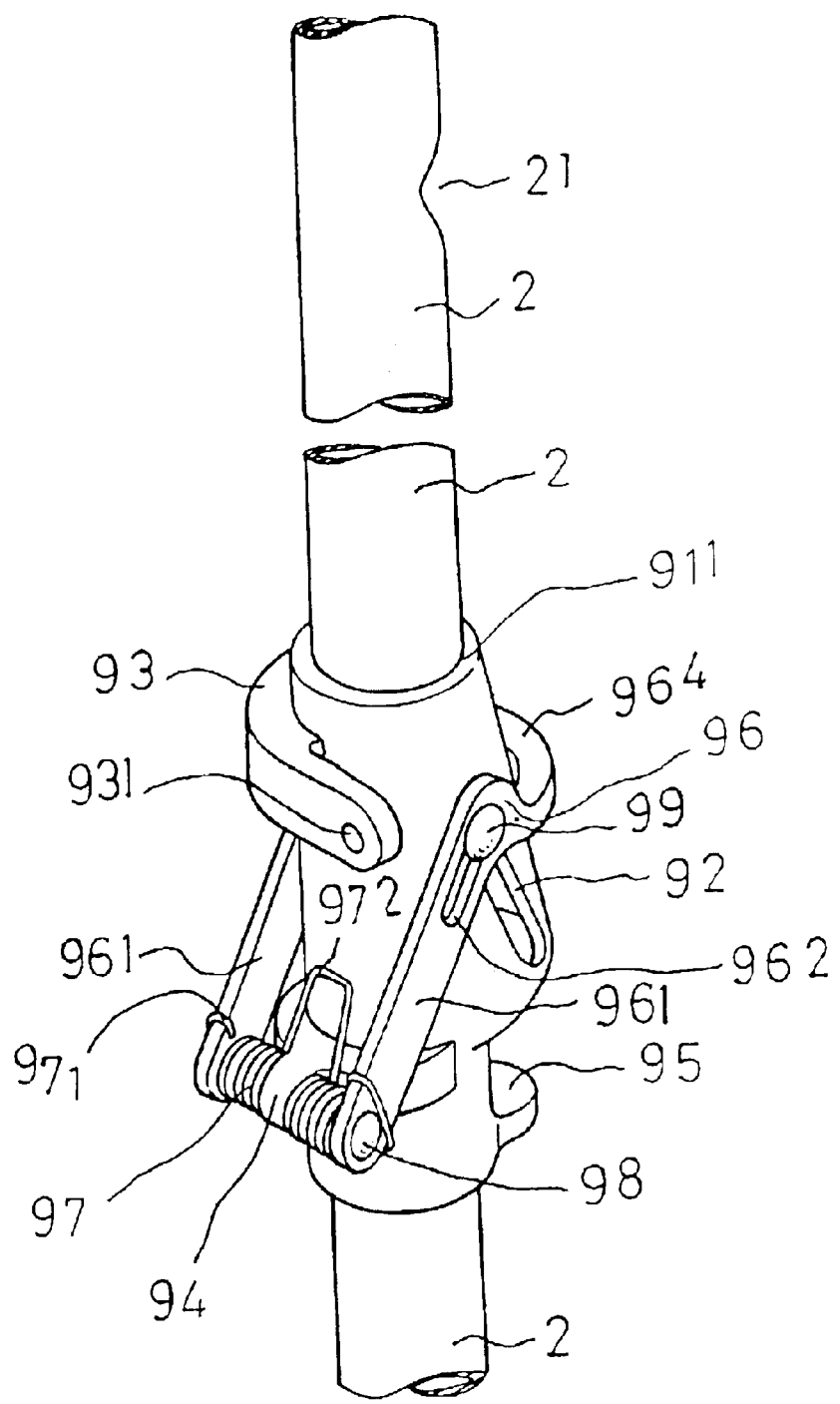
FIG. 10 is a perspective view to show the assembled adjusting member, the handle and the spring member of the stroller of the present invention.
Figure 11:
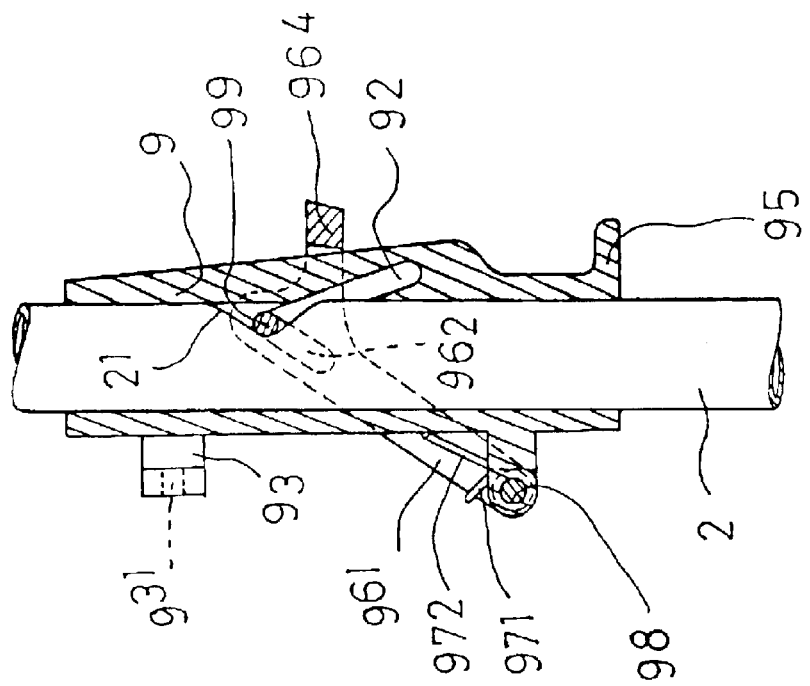
FIG. 11 is a cross sectional view to show the pin of the handle is engaged with the notch of the rear leg tube in the adjusting member.
Figure 12:
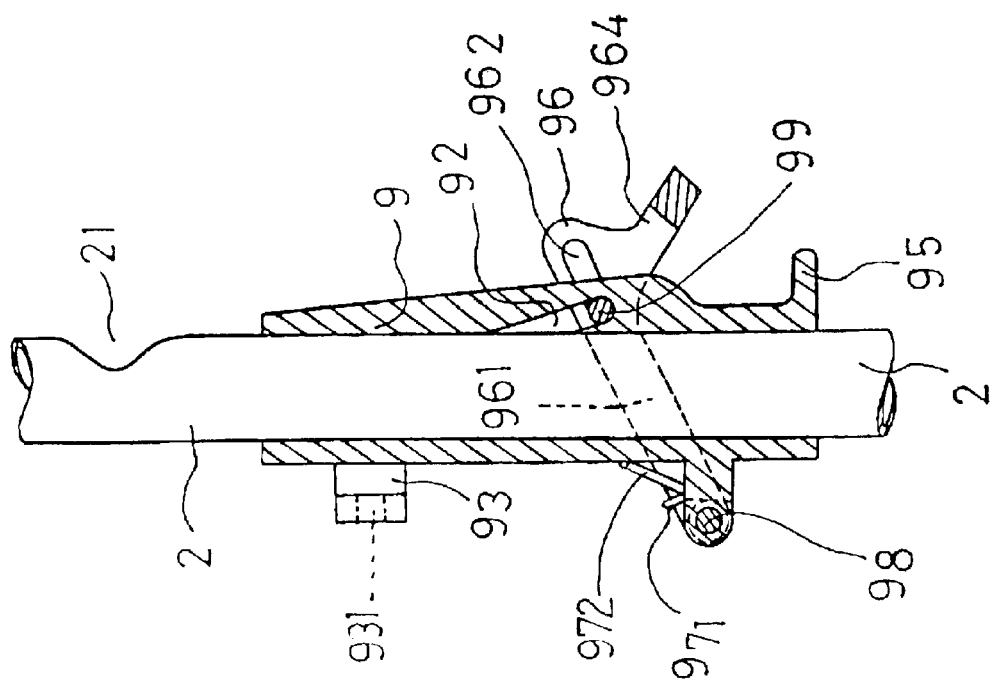
FIG. 12 is a cross sectional view to show the pin of the handle is disengaged from the notch of the rear leg tube in the adjusting member.

Referring to FIGS. 5, 6 and 7, the stroller of the present invention comprises two front leg tubes 1 each having a front wheel connected thereto and a first joint member 10 with two holes is connected to each front leg tube 1. Two handles 3 are respectively connected to the two first joint members 10 and two second joint members 20 are connected to the two handles 3 so that two rear leg tubes 2 are respectively connected to two second joint members 20. Each rear leg tube 2 has a rear wheel connected thereto. Two armrests 8 are pivotably connected to the two handles 3 and a folding assembly "W" is connected between the two handles 3 and located close to the grasps on the two handles 3.

Figure 8:
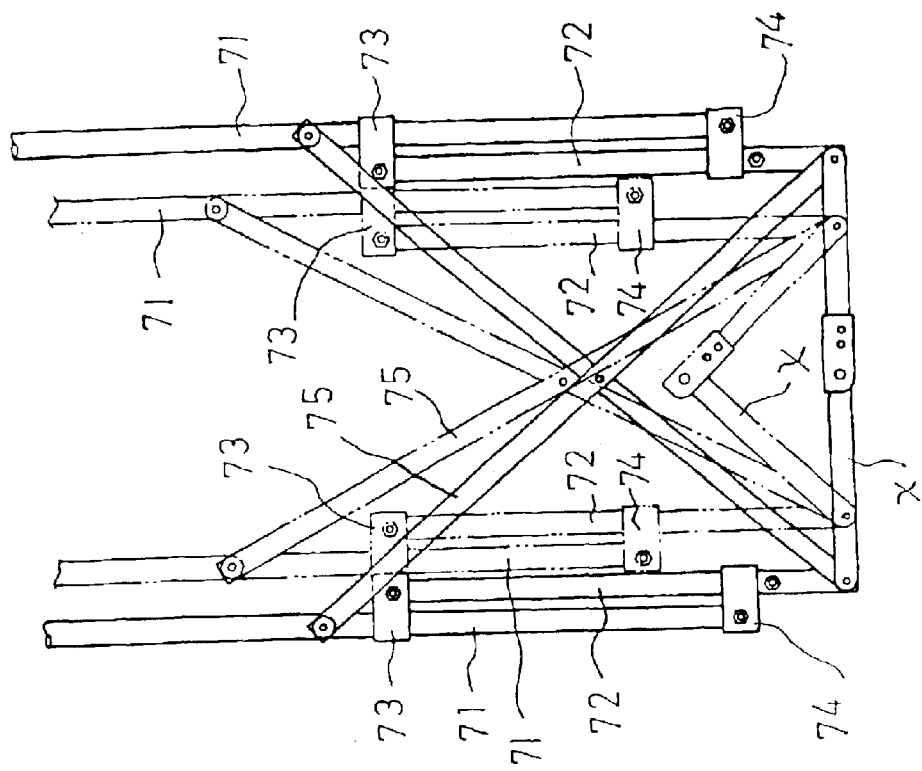
FIG. 8 shows the folding action of the rear upright tubes and the assist tubes of the stroller of the present invention.

Two rear upright tubes 71 each have a top end connected to the handle 3 corresponding thereto and a third joint member 73 and a fourth joint member 74 are respectively mounted to each rear upright tube 71. Each of the third joint members 73 includes two holes 731, 732 and each of the fourth joint members 74 includes two holes 741, 742. A lower end of each rear upright tube 71 is fixedly connected to the fourth joint tube 74 in the hole 741 of the fourth joint member 74 by a screw 710 and the rear upright tube 71 movably extends through the hole 731 in the third joint member 73. Two assist tubes 72 are located beside the rear upright tubes 71 and a top end of each assist tube 72 is fixedly received in the hole 732 by a screw 720. A lower end of each assist tube 72 movably extends through the hole 742 of the fourth joint member 74. The rear legs tubes 2 are connected to the assist tubes 72 by two L-shaped plates and a cruciform folding assembly 75 including two tubes pivotably connected at point 750 as shown in FIG. 7 is connected between the two rear upright tubes 71 by screws 751. A folding assembly "X" is connected to the two the tubes of the cruciform folding assembly 75 at points 752. Referring to FIG. 8 when folding the stroller.

Two seat tubes 4 are respectively connected to the front leg tube 1 and the lower end of the assist tube 72 on the same side as the seat tubes 4. A cruciform folding assembly 6 having two tubes is located an underside of the stroller and the tow tubes of the cruciform folding assembly 6 are respectively connected to the front leg tubes 1 and the seat tubes 4. Two backrest tubes 5 pivotably connected to the seat tubes 4 and a support plate 50 is connected between the backrest tube 5 and a adjusting member 9 mounted on the rear leg tube 9 on the same side of the backrest tubes 5.

Referring to FIGS. 9 to 12, the two adjusting members 9 each have a through hole 911 and the rear leg tubes 2 extend through the through holes 911. Each adjusting member 9 has two inclined slots 92 defined through a wall thereof. A protrusion 94 extends from an outside of each adjusting member 9 and two tubes 941 extends on two ends of the protrusion 94. The two tubes 941 share a common through hole and each have an opening 940 at a distal end thereof. A torsion spring member has two torsion spring parts 97 which are connected by a connection portion 972. The two torsion spring parts 97 are respectively mounted to the two tubes 941 and the connection portion 972 contacts against the protrusion 94. Each torsion spring part 97 has a hook portion 971.

Figure 13:
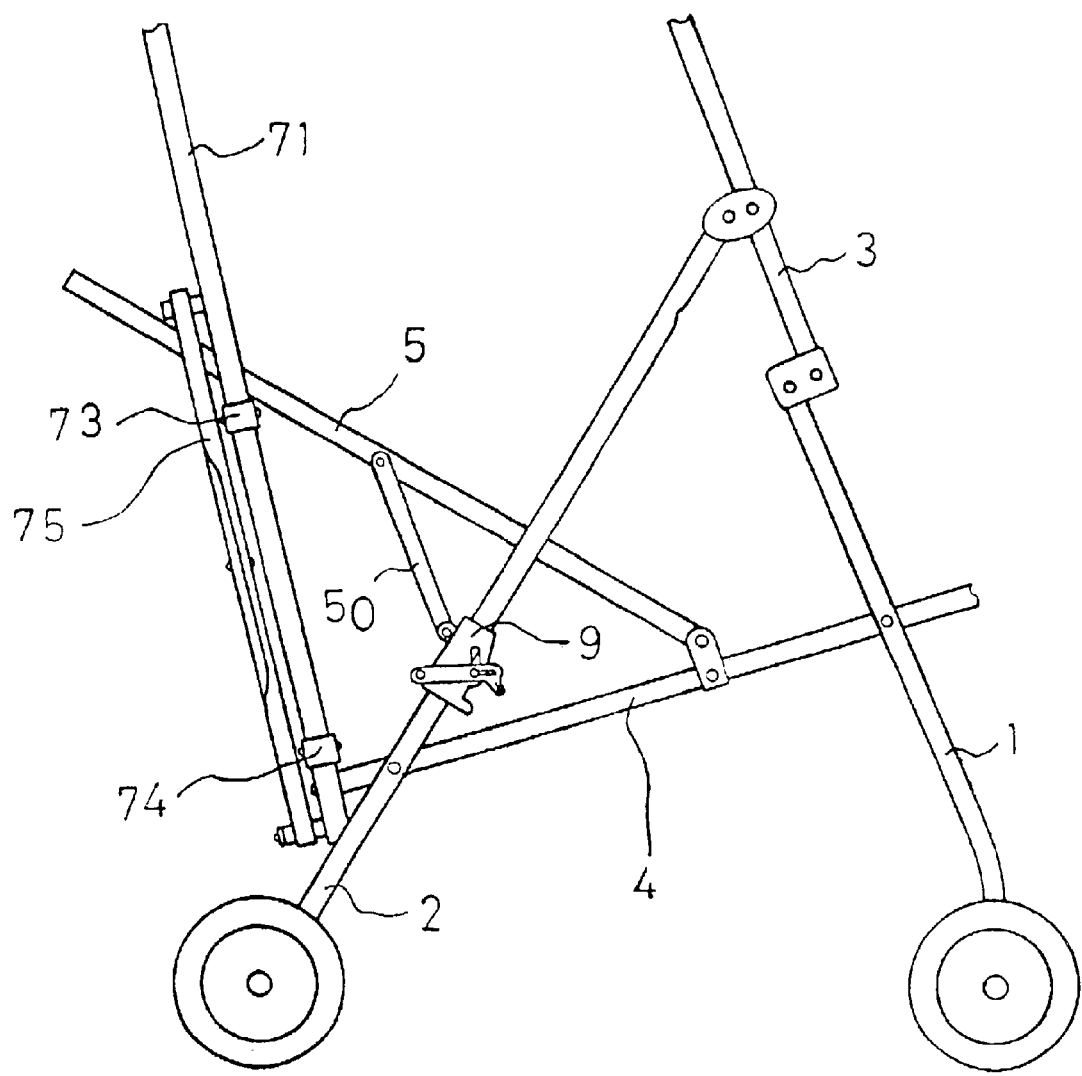
FIG. 13 shows the backrest frame is supported by two support plates connected to the adjusting members.

A U-shaped handle 96 has two side plates 961 between which the adjusting member 9 is located. Each side plate 961 has an elongate hole 962 and a pin 99 extending through the two elongate holes 962 and the inclined slots 92 of the adjusting member 91. A distal end of each of the side plates 961 has a hole 963 and is pivotably connected to the two tubes 941 by a pin 98 extending through the holes 963 and the through hole of the two tubes 941 via the openings 940. The two hook portions 971 are respectively hooked on the two side plates 961 so that the pin 99 is biased by a force coming from the torsion spring parts 97 toward the rear leg tube 2 in the adjusting member 9. A notch 21 is defined in each of the two rear leg tubes 2 so that the pin 99 is engaged with the notch 21 so as to prevent the rear leg tubes 2 from moving. An operation bar 964 is connected between the two side plates 961 so that the user may pivoted the operation bar 964 downward to remove the pin 99 from the notch 21. A stop 95 extends from the outside of the adjusting member 9 so limit the movement of the operation bar 964. A flange 93 extends from the outside of the adjusting member 9 and has an engaging hole 931 with which the support plate 50 is connected. Therefore, when the backrest 5 is leaned backward, because the pin 99 is engaged with the notch 21 in the rear leg tube 2 so that the backrest tubes 5 are well supported by the support plates 50 as shown in FIG. 13.

The combined rear upright tubes 71 and the assist tubes 72 reinforce the structural strength of the stroller and make the whole stroller to be stable and reliable. The adjusting members 9 and the rear leg tubes 2 allow the backrest tubes 5 to be leaned with enough support.

While we have shown and described the embodiment in accordance with the present invention, it should be clear to those skilled in the art that further embodiments may be made without departing from the scope of the present invention.

What is claimed is:

1. A stroller comprising:

two front leg tubes each having a front wheel connected thereto and a first joint member connected to each front leg tube, two handles respectively connected to the two first joint members, the two second joint members connected to the two handles and two rear leg tubes respectively connected to two second joint members, each rear leg tube having a rear wheel connected thereto;

two rear upright tubes each having a top end connected to the handle corresponding thereto and a third joint member and a fourth joint member respectively mounted to each rear upright tube, a lower end of each rear upright tube fixedly connected to the fourth joint tube and the third joint member being movably mounted to the rear upright tube, two assist tubes located beside the rear upright tubes and a top end of each assist tube fixedly connected to the third joint member, a lower end of each assist tube movably extending through the fourth joint member;

two seat tubes respectively connected to the front leg tube and the lower end of the assist tube on the same side as the seat tubes, two backrest tubes pivotably connected to the seat tubes and a support plate connected between the backrest tube and the rear leg tube on the same side of the backrest tubes;

at least one folding assembly pivotably connected between the two lower ends of the assist tube and between the two handles;

two adjusting members respectively mounted to the rear leg tubes and each adjusting member having two inclined slots defined through a wall thereof, a protrusion extending from an outside of each adjusting member and two tubes extending on two ends of the protrusion, a torsion spring member having two torsion spring parts which are connected by a connection portion, the two torsion spring parts respectively mounted to the two tubes and the connection portion contacting against the protrusion, each torsion spring part has a hook portion, a U-shaped handle having two side plates between which the adjusting member is located, each side plate having an elongate hole and a pin extending through the two elongate holes and the inclined slots of the adjusting member, a distal end of each of the side plates pivotably connected to the two tubes and the two hook portions respectively hooked on the two side plates, the pin disengageably engaged with a notch defined in each of the two rear leg tubes by a force coming from the two torsion spring parts.

* * * * *